May 17, 1966  J. R. URSCHEL ETAL  3,251,557
SHAVING MILL AND METHOD OF COMMINUTING
Filed June 6, 1963  5 Sheets-Sheet 1

INVENTOR.
JOE R. URSCHEL
EDGAR R. SANDERS
BY
Charles S. Penfold
ATTORNEY

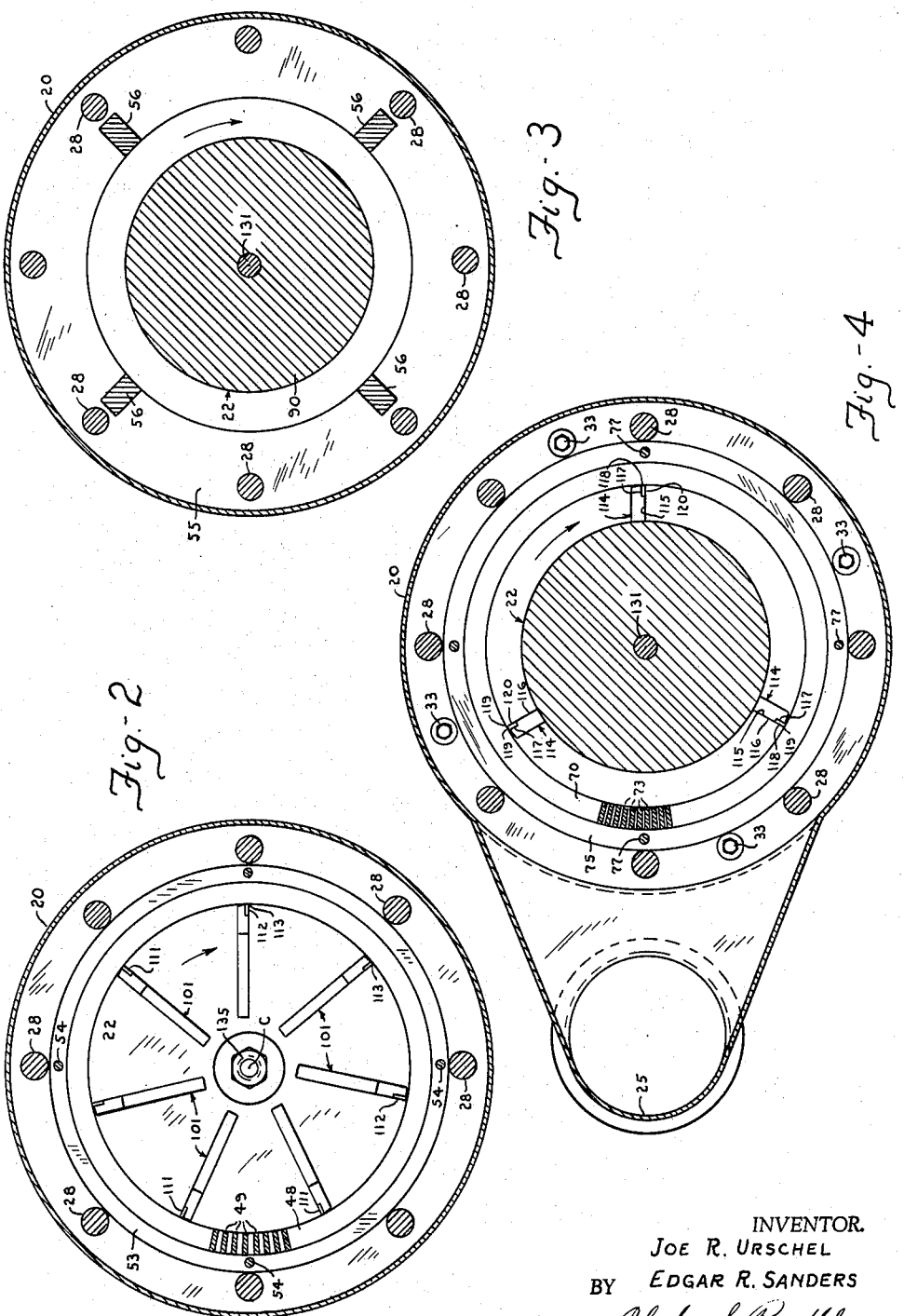

May 17, 1966  J. R. URSCHEL ETAL  3,251,557
SHAVING MILL AND METHOD OF COMMINUTING
Filed June 6, 1963  5 Sheets-Sheet 3

INVENTOR.
JOE R. URSCHEL
EDGAR R. SANDERS
BY
ATTORNEY

May 17, 1966  J. R. URSCHEL ETAL  3,251,557
SHAVING MILL AND METHOD OF COMMINUTING
Filed June 6, 1963  5 Sheets-Sheet 4

INVENTOR.
JOE R. URSCHEL
EDGAR R. SANDERS
BY
Charles A. Penfold
ATTORNEY

May 17, 1966  J. R. URSCHEL ETAL  3,251,557
SHAVING MILL AND METHOD OF COMMINUTING
Filed June 6, 1963  5 Sheets-Sheet 5
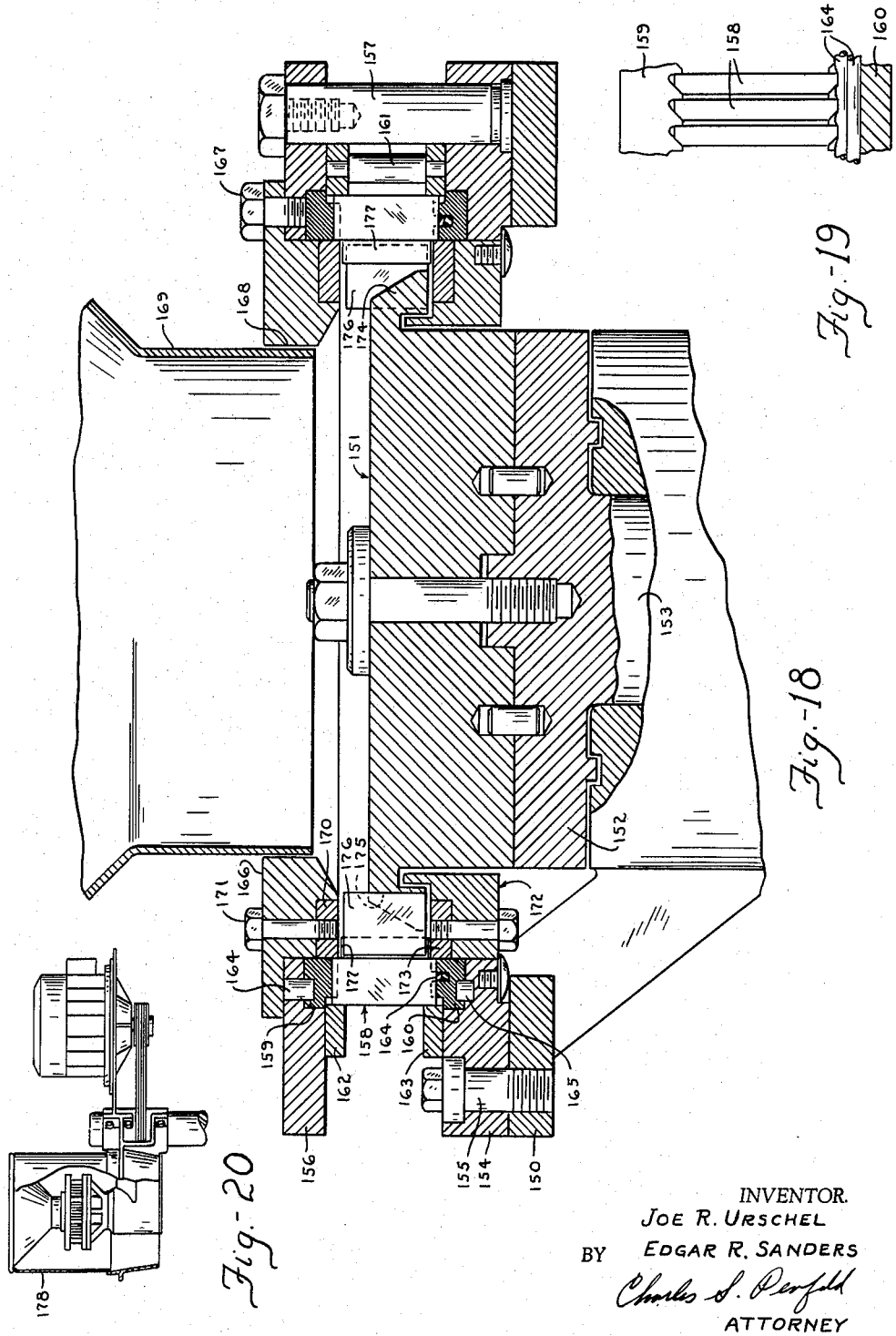
INVENTOR.
JOE R. URSCHEL
BY  EDGAR R. SANDERS
ATTORNEY 3,251,557
SHAVING MILL AND METHOD OF
COMMINUTING
Joe R. Urschel, 202 Michigan Ave., and Edgar R. Sanders,
708 Evans Ave., both of Valparaiso, Ind.
Filed June 6, 1963, Ser. No. 285,936
16 Claims. (Cl. 241—5)

The subject invention relates generally to means for conditioning a product and more particularly is directed to a machine and/or method whereby different products can be shaved or cut into small pieces or flakes of various sizes.

One of the primary objects of the invention is to provide a machine and/or method which overcomes the known disadvantages inherent in conventional hammer and cutting mills and affords a novel organization whereby various products can be efficiently reduced in size by a cutting-shaving principle.

An important object of the invention is to provide a machine comprising a plurality of two cutter or product conditioning assemblies operatively connected together in a superposed or end-to-end relationship, impeller means disposed substantially within the confines of the assemblies, and surrounding structure whereby a product is first conditioned and then discharged by one cutter assembly into an adjacent cutter assembly where it is conditioned a second time and then discharged into the surrounding structure for eventual flow into a container for future usage.

A significant objective of the subject invention is to provide a machine which is particularly useful in conditioning a slurry or a liquid containing particles suspended therein by preferably reducing the size of the particles through the multiple or compound action produced by the dual cutter assemblies through the agency of the impeller.

A specific but important object is to provide a machine of the character above described in which each of the cutter assemblies preferably comprises axially spaced rings and circumferentially spaced axially extending knives which are secured in seats provided in the rings to form an annulus or a generally cylindrical structure within which the impeller is rotatably mounted for rotating and forcibly directing the product to be conditioned against the knives for cutting and discharge outwardly therebetween.

A particular object of the invention is to provide knives which are preferably planar and rectangular in cross-section and the ends of the knives and the seats in the rings are so designed and constructed that the knives can be disposed very close together and at the same time afford a strong support therefor. The knives are so arranged that inner narrow rectangular edges or surfaces thereof facing the center of the machine are disposed substantially tangent to the inside of the cylinder formed by the knives and that larger leading rectangular side surfaces or faces thereof are disposed radially, all of which will be described more in detail subsequently.

Also, an object of the invention is to provide a unique setup whereby the knives may be readily mounted in any one of a plurality of positions so that any one of a plurality of corner cutting edges or arrises provided on each knife can be utilized to cut or shave the product.

Another object of the invention is to provide an impeller embodying improved principles of design and construction and which preferably serves the dual purposes of successively directing the material or product to the respective cutter assemblies.

Another specific object is to provide novel means for operatively connecting the cutter assemblies.

With the foregoing in mind, the machine offers such advantages as: a greater degree of reduction and uniformity in the product whereby to improve the viscosity through exposure of additional particle surfaces of the product capable of absorption by the liquid media, as distinguished from using a single cutter assembly; economies with respect to manufacture and assembly, operation, efficiency, and durability.

Additional objects and advantages of the invention will become apparent after the description hereinafter set forth is considered in conjunction with the drawings annexed hereto.

In the drawings:

FIGURE 2 is a horizontal section taken substantially on line 2—2 of FIGURE 1;

FIGURE 3 is a horizontal section taken substantially on line 3—3 of FIGURE 1;

FIGURE 4 is a horizontal section taken substantially on line 4—4 of FIGURE 1;

FIGURE 18 is a partial diagrammatic view showing that knives in both upper and lower cutter assemblies of a machine may be circumferentially spaced to the same extent and greater than those illustrated in FIGURE 16;

FIGURE 19 is a partial vertical section showing the mode of supporting the knives and their relationship to resiliently flexible means carried by a support therefor; and FIGURE 20 is a partial elevational view illustrating a mode of mounting the assembly shown in FIGURE 15.

Figure 1:
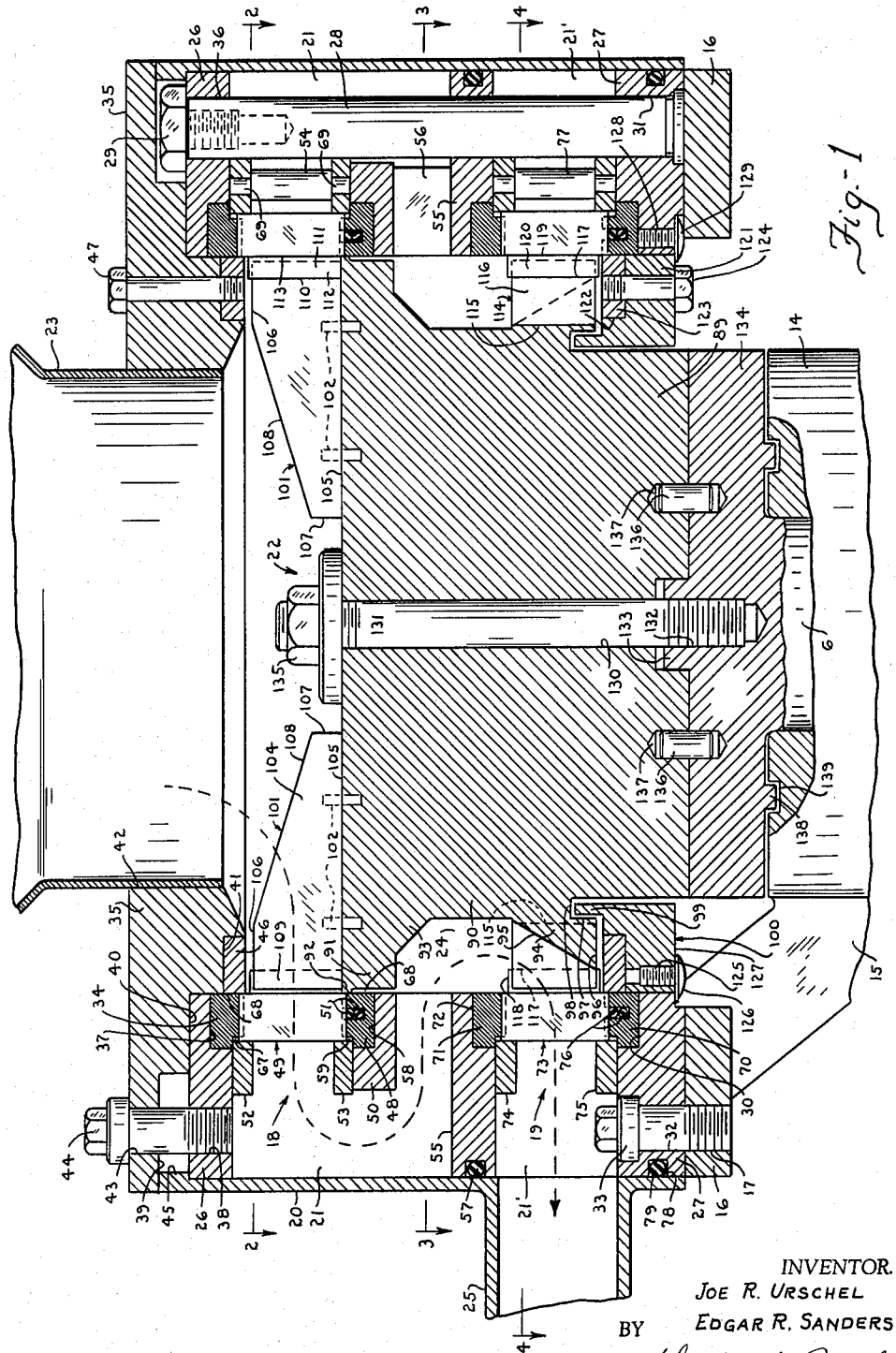
FIGURE 1 is a partial vertical section of the machine illustrating the operative relationship of a pair of cutter assemblies and impeller means thereof.
Figure 10:
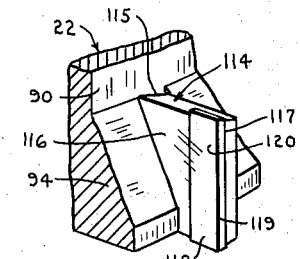
FIGURE 10 is a partial perspective view of the impeller means.
Figure 9:
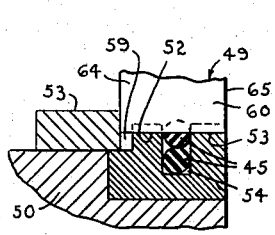
FIGURE 9 is a partial vertical section showing details of resiliently flexible means which may be utilized with either of the cutter assemblies.
Figure 6:
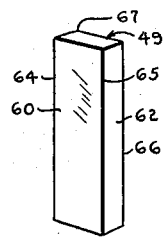
FIGURE 6 is a perspective view of one of a plurality of knives employed in the structure of FIGURE 5.
Figure 11:
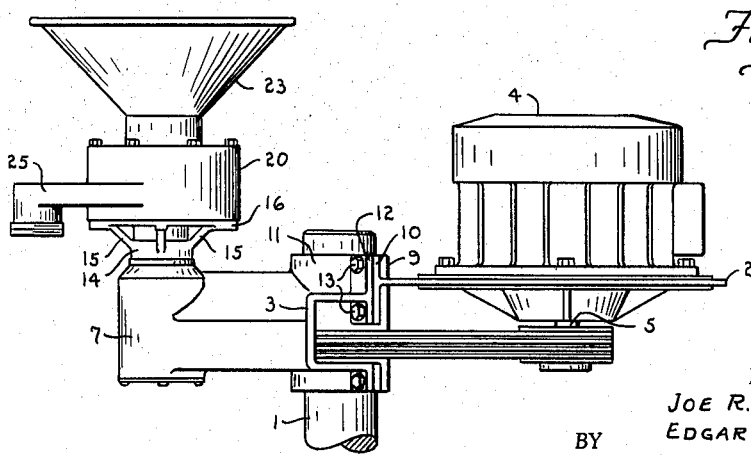
FIGURE 11 is a partial elevational view of the machine.
Figure 12:
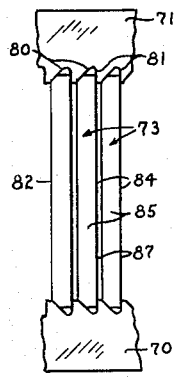
FIGURE 12 is a partial elevational view of the lower cutter assembly showing details thereof.
Figure 13:
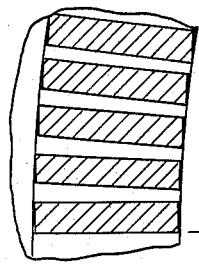
FIGURE 13 is a partial diagrammatic view showing the relationship of certain surfaces or areas of the knives of the upper cutter to the axis of the machine.

Referring first to the embodiment of the invention exemplified in FIGURES 1 through 14 of the drawing, and particularly to FIGURES 1 and 11, there is shown a post or pillar 1 to which supports 2 and 3 are connected. The pillar is carried by a base, not shown, to facilitate placement of the pillar and machine carried thereby. A motor 4 is mounted on the support 2 and provided with a vertical drive shaft 5 which is preferably operatively connected to a vertical driven shaft 6 through a plurality of V-belts and pulleys. The driven shaft is journalled in a bearing structure of the support 3, the latter also including a housing 7 within which pulleys on the driven shaft and portions of the belts are concealed for protection.

The supports may be designed and constructed as desired and as shown the support 2 is provided with a semi-cylindrical portion 9 receiving the pillar and a pair of flanges 10. The support 3 is similarly provided with a receiving portion 11 and a pair of flanges 12. It will be observed that only one of each of the pairs of flanges 10 and 12 are shown in FIGURE 11. Bolts 13 may be extended through holes in the flanges for detachably clamping the supports in any desired rotative and elevated position on the pillar for stability and convenience in operation.

The support 3 is provided with a spider-like mounting having a tubular portion 14 through which the driven shaft 6 extends and a plurality of inclined arms 15, which are joined by an annular rest 16 provided with circumferentially spaced threaded apertures 17.

The composite or dual cutter structure, as illustrated in FIGURE 1, is adapted to be mounted on the rest 16 and will now be described. This embodiment discloses, among other things, a tubular cylindrical structure having an upper cutter or knife assembly or unit generally designated 18 and a lower cutter or knife assembly or unit generally designated 19, wall structure including a housing 20 which defines in combination with the structure a pair of annular chambers 21 and 21' respectively surrounding the cutter assemblies, and chambered impeller means generally designated 22 rotatably mounted in said cutter structure for directing a product fed through a funnel 23 into the upper cutter assembly against its knives for initial conditioning or reduction thereby and passage therebetween into the upper chamber 21 and from the latter through a chamber 24 in the impeller means and thence into the lower cutter assembly 19 for directing the conditioned product against its knives for additional conditioning or reduction and flow therebetween into the lower chamber 21' for eventual discharge through an outlet 25 for the use desired. Otherwise expressed, the composite tubular cylindrical structure has axially aligned cutter assemblies with chambers respectively surrounding these assemblies and impeller means which serves to successively force the product through the assemblies via a plurality of communicatively connected chambers or passages.

The cutter assemblies are preferably held or clamped in their respective axially aligned operative positions between an upper annular support 26 and a lower annular support 27, which supports are detachably connected by a plurality of circumferentially spaced bolts 28 having shanks extending through these supports and nuts 29 engaging the support 26.

The lower support 27 is provided with an inner rabbet or recess 30, a plurality of circumferentially spaced counterbored apertures 31 which respectively receive lower headed ends of the bolts, a plurality of counterbored apertures 32 which receive headed screws 33 for detachably connecting the composite structure on the rest 16, as alluded to above.

The upper support 26 constitutes a component of the upper cutter assembly 18 and is operatively connected to an upper ring 34 of this assembly and supports the housing 20, including an annular member 35 which carries the funnel 23. The support 26 is provided with circumferentially spaced apertures 36 which receive the shanks of the bolts 28, an annular rabbet 37 which receives the ring 34, and a plurality of circumferentially spaced threaded apertures 38. The member 35 is provided with three rabbets 39, 40 and 41, including an opening 42 in which the funnel is secured. The member 35 is also provided with a plurality of circumferentially spaced apertures 43 through which screws 44 extend for connection with the threaded apertures 38 for locking an inturned circumferential lip 45 of the housing in the rabbet 39 between the support 26 and member 35. It will be noted that the rabbet 39 also receives the heads of the screws 29 of the bolts 28. The rabbet 40 receives the support 26 and a portion of the ring 34 and an annular wear member 46 is held in the rabbet 40 by screws 47 which extend through the member 35 and into threaded apertures provided therefor in the member 46.

The upper cutter assembly 18, which will now be described, includes the support 26, ring 34, a lower ring 48, a set or bank of circumferentially spaced knives respectively generally designated 49, a lower annular support 50, resiliently flexible means 51 carried by the ring 48, and a pair of annular abutment means 52 and 53 held in a predetermined spaced relationship by a plurality of circumferentially spaced spacers or pillars 54. The lower support 50 is preferably affixed to an annular member 55 by a plurality of four vane-like elements 56 to provide an integral unit which serves to space the cutter assemblies axially apart a predetermined distance as shown in FIGURES 1 and 3. The support 50, member 55 and vanes define radial passages which connect the annular chamber 21 and the impeller chamber 24. The member 55 constitutes an upper component of the lower cutter assembly 19 and serves as a wall or partition carrying a gasket 57 for engaging a cylindrical wall of the housing 20 to divide a cylindrical space formed by the housing and cutter structure into the chambers 21 and 21' above referred to.

Figure 5:
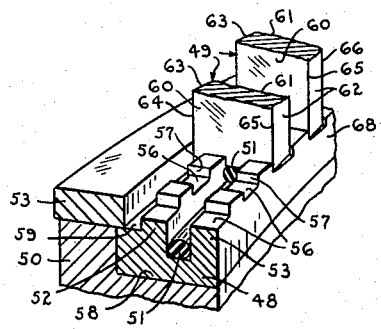
FIGURE 5 is a partial perspective view showing details of an upper cutter assembly or unit of the machine.

More specifically, as shown in FIGURE 5, the lower ring 48 of the upper assembly 18 is preferably in the form of an annular plate disposed in a rabbet 58 provided therefor in the support 50. The ring is provided with a rabbet 59 leaving a raised portion which is divided into inner and outer annular ridges 52 and 53 by an annular groove 54 in which is disposed resiliently flexible means 51 preferably in the form of a pair of gaskets or C-rings. The upper surfaces of the ridges are preferably interrupted by substantially radially extending notches which are equally spaced apart circumferentially. Each of the notches is defined by a bottom surface 56 and a pair of parallel side surfaces 57 to form receiving means or seats for lower ends of the knives 49. The resiliently flexible means assists in serving to resiliently support, hold or otherwise stabilize the position of the knives which bear on such means. Each of the gaskets 51 is preferably made of elastomeric material, although any material suitable for the purpose may be used. The cross-dimension of the flexible means is preferably greater than the depth of the groove so that it will be compressed when pressure is applied thereto.

The knives 49 are preferably elongate and rectangular in cross-section to provide a pair of substantially corresponding parallel large or wide planar surfaces or areas 60 and 61 and a pair of corresponding parallel relatively narrow rectangular surfaces or areas 62 and 63. The surfaces 61 and 62 are disposed substantially perpendicular to the surfaces 62 and 63 and define in conjunction therewith four corresponding corner cutting edges or arrises 64, 65, 66 and 67. The size of the notches above referred to are such that either extremity or end of each knife can be readily inserted and snugly received in a notch and so that either of their narrow surfaces 62 or 63 can be disposed adjacent inner cylindrical surfaces 68 of the rings 34 and 48. It will be evident that the width of the knives is slightly greater than the radial dimension of the raised portion having the notches therein and that the knives do not project inwardly from the surfaces 68.

The abutment means 53 is preferably in the form of an annular member, substantially rectangular in cross-section, and has an inner portion which is disposed in the rabbet 59 of the ring 48 for overlapping the latter and engaging the knives 49 to constitute a backing for limiting outward movement of the knives as well as a means for locking either of the inner narrow surfaces 62 and 63 of the knives in a generally cylindrical concentric relation to a longitudinal axis or center C of the cutter structure as depicted in FIGURE 2.

The upper ring 34 of the upper assembly 18 is provided with notches for receiving upper ends of the knives and an outer rabbet 67, with the abutment 52 disposed in this rabbet to underlie the ring 34 and engage the support 26 and upper ends of the knives, all in a manner similar to that above described. It will be observed that the ring 34 is not provided with resiliently flexible means for engaging the upper ends of the knives.

The annular abutment means 52 and 53 are preferably identical and each is provided with a plurality of circumferentially spaced holes for receiving reduced cylindrical ends 69 of the pillars 54, the latter having shoulders which engage opposed planar surfaces of the abutment means.

As exemplified in FIGURES 2, 5, 13 and 14, the knives 49 are preferably resiliently locked in place so that the large planar surfaces 60 are radially disposed or aligned with the radii R. These surfaces constitute impact surfaces against which the product is centrifugally thrown by the impeller means 22. The cutting edges 65 of the knives are uniformly spaced circumferentially about the axis C and the inner narrow surfaces 62 are disposed tangent to a circle generally defined by the edges 65 and assist in directing the product against such edges.

The cutting assembly or head 18 may also be described as being made up of many flat shaving knives or plates, having a rectangular cross-section, arranged uniformly in the shape of a cylinder with one of the narrow faces of the rectangles facing toward the center and with the leading sides or wide faces 60 of the rectangles being disposed on an approximate extension of the radius of the cylinder. This arrangement causes each of the inner narrow faces 62 of the knives to be approximately tangent to the inside of the cylinder at the leading edge of each knife. The inner narrow faces are guiding surfaces for the product and the leading edges 65 are the cutting or shaving edges as previously alluded to.

The cutter assembly and knives are so constituted that if, for example, one or more of the cutting edges 65 become worn or damaged, one or more of the knives may be removed by merely disconnecting the necessary components so that the knives can be removed and reinstalled to locate any one of the other three cutting edges 64, 66 or 67 in a position previously occupied by the edge 65, whereupon the components are reassembled and retightened to clamp the knives in place. With this unique organization or reversibility set up any one of four cutting edges may be selectively employed or new knives may be substituted for any which are beyond repair.

The lower cutter assembly 19, as depicted in FIGURES 1, 4, 7 and 8, is designed and constructed in a manner similar to that of the upper cutter assembly 18 and will now be described. The assembly 19 includes the lower annular support 27, a lower ring 70 disposed in the rabbet 30 of the support 27, an upper ring 71 disposed in a rabbet 72 provided therefor in the member 55, a plurality of circumferentially spaced axially extending knives respectively generally designated 73, a pair of annular abutments 74 and 75 respectively surrounding and engaging upper and lower extremities of the knives, and resiliently flexible means 76, all of which are substantially similar to the components above described with respect to the assembly 18. More particularly, the annular abutments 52 and 74 are identical and the same is true of the abutments 53 and 75, the rabbets 37 and 72 and rabbets 58 and 30 which receive the rings 34 and 71 and 48 and 70, and the resiliently flexible means 51 and 76. The abutments 74 and 75 are held in spaced relation by spacers or pillars 77 like the pillars 54. The lower annular support 27 is provided with a circumferential groove 78 in which is disposed a gasket 79 for engaging the cylindrical wall of the housing 20 like the gasket 57 and also constitutes a bottom wall of the lower chamber 21'.

Figure 7:
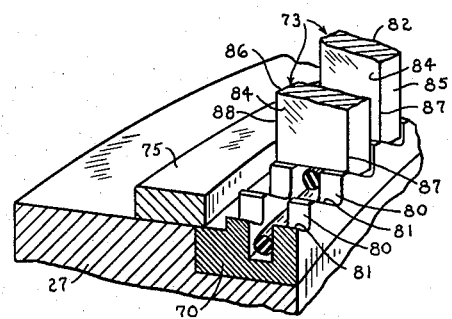
FIGURE 7 is a partial perspective view showing details of a lower cutter assembly or unit of the machine.
Figure 8:
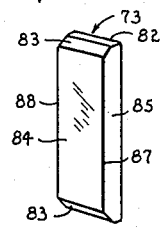
FIGURE 8 is a perspective view of one of a plurality of knives employed in the structure of FIGURE 7.

As exemplified primarily in FIGURES 7 and 8, the lower ring 70 of the assembly 19 is provided with a raised portion having notches therein which are of a different character than the notches in the rings of the upper cutter assembly and receive the knives 73 which are also different from the knives 49. More specifically in this respect, the ring 70 is provided with substantially V-shaped notches, each of which is defined by a vertical buttress surface 80 and an inclined surface 81 for respectively engaging a rectangular planar surface 82 and a bevelled planar surface 83 of the knife. The upper ring 71 is provided with corresponding mating notches which receive upper ends of the knives. Due to the shape and spacing of the notches and the shape of the ends of the knives, the latter can, within practicable limits, be firmly cammed into a firm or tight resilient interlocking connection with the rings in a closer circumferentially spaced relation than the knives 49. As a consequence thereof, the knives 73 being closer together than the knives 49 serve to recondition and additionally reduce the size of substantially all suspended particles of the product flowing through the lower assembly 19.

Each of the knives 73 is also provided with a large rectangular planar face or area 84 opposite the area 82, a pair of narrow planar surfaces 85 and 86 and a pair of cutting edges 87 and 88. As depicted in FIGURE 7 the knives are installed with their narrow surfaces 85 and cutting edges 87 facing the center C of the cutter structure in a manner substantially corresponding to that of the knives 49. If the edges 87 become worn or damaged the knives may be removed and reversibly installed so that the faces 86 and cutting edges 88 will face the center or axis C. New knives may also be installed when required.

The impeller means generally designated 22 will now be described. This means may be designed and constructed in various ways but as disclosed herein comprises a substantially solid body having a lower cylindrical portion 89, and intermediate cylindrical portion 90 slightly larger in diameter than portion 89, and an upper cylindrical portion 90 having a diameter greater than that of portions 89 and 90. Portion 91 is provided with a laterally extending annular portion 92. The portion 92 is disposed in close relation to the raised portion of the ring 48 of the upper cutter assembly and the lower ends of the knives 49 and serves to substantially prevent flow of the material or product to be conditioned downwardly between the impeller and support 50. The body is also provided with a tapered portion 93 joining the portions 90 and 91 and a tapered portion 94 which projects laterally in an overhanging relationship to the lower cylindrical portion 89. The tapered portion 94 is defined by an inclined annular surface 95, a bottom annular surface 96, and a vertical annular surface 97, the latter being in concentric spaced relation to the cylindrical portion 89 to form an internal groove or recess having an upper surface 98. This groove is adapted to receive an upstanding lip or portion 99 of a guard device or sealing assembly generally designated 100 which will be described more in detail subsequently.

The impeller means is preferably provided with a plurality of seven radially extending elongate upper blades or vanes generally designated 101 which are preferably permanently joined to an upper planar surface of the body by dowels 102 and brazing. These blades are identical and each has a pair of parallel large surfaces 103 and 104, a lower surface 105 which bears against the body, an upper horizontal surface 106, an inner end surface 107 terminating a predetermined distance away from the axis C, and inclined surface 108, and an outer vertical surface or portion 109 which is preferably of a height for disposition in a parallel relation to the inner surfaces of the blades 49. The outer portion 109 is preferably provided with a vertical recess 110 in which a cutter element 111 is permanently secured, such as by brazing. Each element is rectangular in cross-section and has an impelling receiving surface 112 and is so disposed that an adjacent vertical cutting edge 113 provided thereon is arranged in relatively close relation to the cutting edges 65 of the knives 49. The radial distance between the cutting edges 113 and the cutting edges 65 is predetermined and may be varied.

The impeller means 22, as depicted in FIGURES 1, 4 and 10, is also preferably provided with a plurality of three circumferentially spaced radially extending lower blades or vanes generally designated 114 which are of a lesser radial extent than the blades 101 and project laterally from the tapered portion 94 of the impeller body. The blades 114 are preferably rectangular in shape and secured in vertical recesses 115 provided in the annular tapered portion 94 of the impeller body by brazing. The blades 114 are identical and each, among other things, is provided with a relatively large impelling surface 116 interrupted by a vertical recess 117 in which a cutting element 118 is preferably permanently secured by brazing so that a cutting edge 119 adjacent said impelling surface 120 of the element is disposed in close rotative parallel predetermined relation to the cutting edges 82 of the knives 73 in a manner similar to that between the cutting edges on the upper blades 101 and the cutting edges 65. The impelling surfaces 116 of the blades and the impelling surfaces 120 of the cutting elements are substantially in the same plane and the same is true of the impelling surfaces of the upper blades and cutting elements thereon.

It is thus apparent that the impeller means is provided with axially spaced cutting blades adjacent its extremities for respectively forcing the product toward the sets or banks of knives of the cutter assemblies. It is to be understood that the impeller may be provided with any number or character of blades desired, the number and character used, being dependent, at least to some extent, on the particular kind of product that is to be conditioned, shaved or cut.

The guard device 100, above referred to, and exemplified in FIGURE 1 preferably comprises an annular member 121 provided with the lip 99, above referred to, including an annular rabbet 122 in which a wear ring 123 is detachably secured by a plurality of circumferentially spaced screws 124. A plurality of circumferentially spaced screws 125 extend upwardly into the member 121 and have heads 126 which engage an inset surface 127 of the lower support 27 for limiting upward movement and positioning the guard device. A plurality of circumferentially spaced screws 128 are connected to the member 27 and have heads 129 which bear against an under surface of the member 121 for limiting downward movement and positioning the device. This guard device assists in directing the flow of the material to be reconditioned toward the knives 73 and also substantially prevents flow of the material downwardly due to the size of the device, the close fits between the member 121 and the support 27 and ring 70, between the rings 123 and 70, and the relationship between the lip 99 on member 121 and the groove in the impeller.

The impeller means may be mounted for rotation at high speeds in the cutter assemblies in various ways but as depicted in FIGURE 1, the impeller body is preferably provided with an axially extending aperture 130 through which a shank 131 of a bolt is extended so that one threaded end can be connected with a threaded aperture 132 in a boss 133 provided on an enlarged head 134 of the driven shaft 6, and a nut 135 and an underlying washer can be connected to an upper threaded end thereof for detachably locking the impeller to the shaft. The boss 133 extends into a recess in the impeller and dowels 136 carried by the head extend into holes 137 in the impeller for keying and stabilizing the connection between the impeller and shaft. If desired, a shroud may be placed over the nut 135 and washer. The head 134 is preferably provided with a circumferential bead 138 which is disposed in an annular groove 139 provided in the bearing structure 14 so as to substantially prevent liquid from entering the bearing.

Attention is directed to the fact that the angle of the impelling or propelling faces or surfaces of the impeller blades is important. The impelling surfaces on the upper and lower blades of the impeller are preferably disposed radially as depicted in order to insure proper presentation of the product to the cutting edges and inner narrow surfaces of the knives. If the impelling surfaces of the blades were disposed to form obtuse angles with the inner narrow surfaces of the knives the product would tend to be lifted away from the knives and this would reduce the capacity of the machine and if the impelling surfaces were disposed to form acute angles with said narrow surfaces the product would tend to be crushed and thereby defeat the purpose of the machine. Although there may be some divergence from radial impelling surfaces on the blades, any great amount of divergence is not desirable.

Of further significance is the fact that if the impeller were constructed so that the impeller surfaces on the impeller blades formed a circle coinciding with the outer edges of the circular end rings supporting the blades, excessive friction would result because small particles of the product would momentarily find their way between the ends of the impeller blades and the guiding surfaces of the shaving knives. Therefore, the leading or impelling surfaces of the cutting elements on the impeller blades are relieved behind the impelling surfaces to gradually increase the clearance between the impeller blades and the knives. The edges 113 and 119 of the cutting elements of the impeller are preferably spaced predetermined distances from the cutting edges 65 and 87 of the knives so as to obtain a shaving or shearing cut without mashing, crushing or grinding of the product. It is desirable that the clearance between the edges 113 and 119 and the innermost edges 65 and 85 of the knives be the smallest practical running clearance so as to prevent the product from rolling under the said edges of the blades which would tend to crush the product and defeat the purpose of the mill. The impeller may be rotated at any speed desired.

Referring now to the operation of the machine, when a product enters the impeller through the funnel for passage through the machine as indicated by the dotted lines in FIGURE 1, it is subjected to the impelling surfaces of the blades 101. The product is then directed outwardly along the impelling surfaces until its outward movement is interrupted by the shaving knives. If the knives were not present and the product were permitted to fly freely off the ends of the impelling surfaces, the product would fly off in a straight line that would form an angle between a radial line and a tangential line. With the knives in place, if their trailing edges were moved outward or if the exit space between the knives were too large, then particles larger than desirable would be produced. Therefore, the guiding faces of the knives should not be greater than a tangent to the leading edges. Also, for any number of knives used in a cylinder, the thickness of the knives must be such that the exit space between them will be large enough to permit exit of the shavings and small enough to prohibit the exit of particles larger than required. The condition described is a momentary condition which occurs only at the time the product first engages the knives. Therefore, any substantial change from a tangential inner face on the shaving plates is not desirable.

Attention is also directed to the fact that when any object is revolved in a circular path and then is released from that circular path, the free flight of the product will describe a straight line tangent to the circle at the point of release from the circular path. When a product is revolved inside the cutting head by the impelling blades, shavings are removed from the product by the leading edges of the shaving knives or plates and as the product leaves each leading edge, it moves out freely on a tangent to the leading edges of the next shafing knife. If the trailing edges of the knives were moved inward, the product would no longer move in free flight but would be pressed against the surfaces 82 and 85 of the knives and much friction and heat would be generated. This is not desirable. The thickness of the shavings produced is controlled entirely by the number of knives in a cutting head for any fixed diameter of cutting head. The greater the number of knives in a cutting head, the less distance the product will move on a tangent between leading edges of the knives and therefore the thinner will be the shaving. When this mill is operated at low impeller speeds, the shavings produced may remain intact, but when operated at high speeds, the high speed of forming the shaving may cause it to break up into smaller pieces. When a product such as rice is shaved with the mill, microscopic examination determines that many curled shavings are produced at lower speeds and that they are broken into smaller pieces at the higher speeds.

In view of the foregoing, it should be manifest that the structural characteristics and relative positions of the cutting edges 65 and 87, radial surfaces 60 and 84, tangential surfaces 62 and 85 on the knives 49 and 73, edges 113 and 119, radial and relief surfaces are all predetermined to obtain an efficient shaving or cutting action on a variety of products, including and not by way of limitation, rice, coffee beans, peanuts, apples and nutmeg, particularly when suspended in a liquid to constitute a slurry.

It is to be understood that if desired, the cutter assemblies may be identical insofar as the knife structure is concerned, that the assemblies shown may be reversed, or may otherwise be modified depending on the character of the product to be conditioned. Also, all or any desired number of knives 49 and 73 may be utilized, for example, every other knife can be omitted in which event the reduction in the size of the product conditioned will be less.

Figure 15:
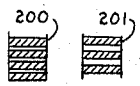
FIGURE 15 is a partial vertical section of a modified structure comprising a single cutter assembly as distinguished from the pair shown in FIGURE 1.
Figure 16:
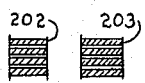
FIGURE 16 is a partial diagrammatic view showing that the knives in an upper cutter assembly may be spaced circumferentially a lesser extent than the knives in a lower assembly.
Figure 17:
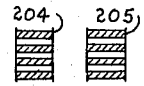
FIGURE 17 is a partial diagrammatic view showing that the knives in both upper and a lower cutter assemblies of a machine may be circumferentially spaced the same extent.
Figure 14:
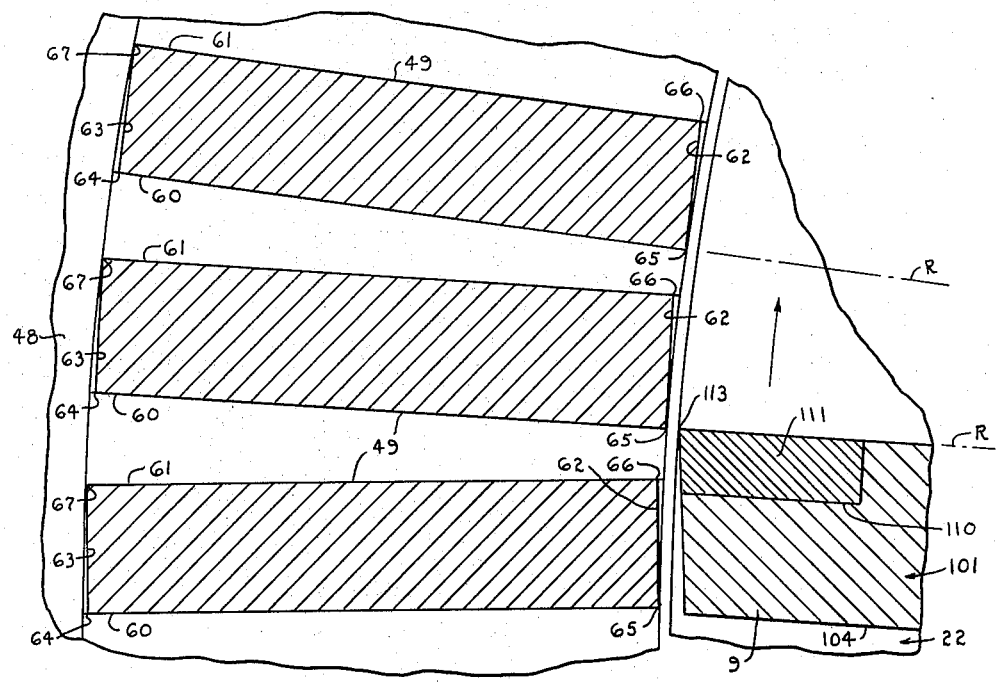
FIGURE 14 is a partial diagrammatic view exemplifying the geometric arrangement of the knives of the upper cutter assembly and portion of the impeller means.

More particularly, FIGURE 15, for example, discloses that a plurality of circumferentially spaced knives 200 of an upper cutter assembly of a machine may be disposed closer together than circumferentially spaced knives 201 of a lower assembly. In FIGURE 16, upper and lower banks of knives 202 and 203 are spaced apart the same extent and this is also true of banks or sets of knives 204 and 205 in FIGURE 17, with the latter knives being spaced apart a greater extent than those in FIGURE 16.

As mentioned above, the machine may be modified so that one cutter assembly, as distinguished from a dual or pair, may be utilized and such an assembly, as will now be described, is exemplified in FIGURES 18, 19 and 20.

The single assembly or unit is adapted to be mounted on a rest 150 corresponding to the rest 16 above described and its impeller means, generally designated 151, is adapted for connection with a head 152 of a driven shaft 153 in the same manner as the impeller means 22. The assembly includes a lower annular support 154 detachably connected to the rest by circumferentially spaced screws 155 and an upper annular support 156 detachably connected to the lower support by bolts 157, the latter of which also serve to clamp between the supports a plurality of knives generally designated 158 between a pair of rings 159 and 160, and spacer means 161 between a pair of annular abutment means 162 and 163 which surround and engage upper and lower extremities of the knives. The ring 160 is preferably provided with a circumferential groove in which resiliently flexible means 164 is disposed for resiliently supporting the knives.

The upper and lower rings 159 and 160 are preferably respectively held in rabbets against relative rotation with respect to the supports 154 and 156 by dowels 164 and 165.

A member 166 is detachably connected to the upper support 156 by screws 167 and provided with an opening 168 which receives a cylindrical portion of a funnel 169. A wear ring 170 is detachably held by screws 171 in a rabbet provided in the member 166 and a guard device generally designated 172 is provided with a wear ring 173. This guard device substantially corresponds to the guard device described above and is mounted in substantially the same way. It will be observed that the wear rings are disposed in spaced axial alignment and respectively bear against the rings 159 and 160.

The knives 158 may be of either of the kinds above described or otherwise but are preferably substantially the same as the knives 73 and mounted in substantially the same way.

The impeller means 151 substantially corresponds to the lower extremity of the impeller means 22 and includes a tapered portion 174 provided with notches 175 in which radial blader 176 are secured, with upper portions of the blades projecting above a planar top surface of the impeller body and with side portions projecting laterally from the tapered portion in opposed relation to the knives 158. It will be observed that the height of the blades is more or less that of the height or length of the knives and that the blades are provided with vertical recesses in which cutting elements 177 are secured, with cutting edges of the elements being juxaposed in relation to the cutting edges of the knives.

The operation of the cutter structure shown in FIGURE 15 is similar to the lower part of the dual assembly as above described. More particularly in this respect, the product to be conditioned is fed through the funnel onto the impeller and due to the speed of the impeller, the product is directed by centrifugal force against the knives, through the assistance of the blades 176, where it is shaved or sheared as it flows outwardly between the knives and thereafter downwardly through guide means 178 to a container not shown.

Having thus described our invention, it is obvious that various modifications may be made in the same without departing from the spirit of the invention, and therefore, we do not wish to be understood as limiting ourselves to the exact forms, constructions, arrangements and combinations of parts herein shown and described.

We claim:

1. A machine of the kind described comprising a pair of superposed cutter assemblies, circumferentially disposed means interposed between and engaging said cutter assemblies for axially spacing them apart, wall structure disposed in concentric spaced surrounding relation to said assemblies defining an annular chamber provided with an outlet, and impeller means arranged in said assemblies and provided with circumferentially spaced upstanding blades for directing a product through one of said assemblies into said chamber and from said chamber into the other of said assemblies through said impeller means and through said other assembly into said chamber for discharge into said outlet, said impeller means also having an upper relatively large uncovered central area receiving the product.

2. A machine of the kind described having an inlet and comprising tubular cylindrical cutter structure having circumferentially spaced knife means, annular wall structure disposed in concentric spaced surrounding relationship to said cutter structure and defining chamber means having an outlet, and impeller means mounted for rotation in said cutter structure and provided with an annular passage whereby a product to be conditioned and introduced into one end of said cutter structure through said inlet will be forced against said knife means and outwardly therebetween into said chamber means and from said chamber means back into said cutter structure through said passage for reengagement with said knife means and outwardly therebetween into said chamber means for discharge from said outlet, said impeller means providing the sole means for directing the product to said knife means and having an upper relatively large uncovered central area for directly receiving the product after it initially passes through said inlet.

3. In combination: a pair of axially aligned substantially cylindrical cutter assemblies respectively having circumferentially spaced knives, wall structure disposed in concentric spaced relation to said assemblies and forming a cylindrical space thereabout, means extending transversely into said space serving to divide the latter into first and second chambers respectively surrounding said assemblies, and chambered impeller means disposed for rotation in said assemblies and provided with circumferentially spaced blades of appreciable vertical height whereby a product fed to one assembly for conditioning will be directed said blades against and between the knives thereof into said first chamber and from the latter through the chamber in said impeller means into the other assembly for engagement with and passage between the knives thereof for reception in said second chamber, and said second chamber being provided with an outlet, said impeller means having an upper relatively large uncovered area for initially receiving the product to be conditioned.

4. In combination: tubular cylindrical structure having a pair of aligned assemblies, partition means interposed between said assemblies, circumferentially spaced means disposed between one of said assemblies and said partition means for axially spacing them apart, each of said assemblies having a set of circumferentially spaced axially extending knives which are so arranged with relation to said partition means that a product may be successively forced against the knives of each set for conditioning the product as it flows between the knives, and means for axially forcing said assemblies toward said partition means for holding them in assembled relation.

5. An assembly comprising a pair of annular rings having opposed parallel flat surfaces and inner and outer parallel surfaces disposed substantially perpendicular to said flat surfaces, and aligned circumferentially spaced corresponding notches interrupting said flat surfaces and said inner and outer surfaces of said rings, each of said notches being defined by a planar surface disposed transverse to said flat surfaces and an adjacent planar surface disposed at an oblique angle to said flat surfaces and said transverse surfaces.

6. The assembly defined in claim 5, including knives having ends seated in said notches, means for clamping said rings against said knives, and spaced means surrounding said rings serving as abutments for said knives.

7. In combination: a first assembly comprising a plurality of circumferentially spaced longitudinally extending knives, a second assembly comprising a plurality of circumferentially spaced longitudinally extending knives, means clamping said assemblies coaxially to form a tubular cylindrical structure whereby a product introduced to said structure can be successively directed against the knives of each assembly for conditioning, and an impeller structure adapted for rotation substantially within the confines of said assemblies, said impeller structure comprising a head having an upper surface provided with circumferentially spaced upstanding product engaging blades and an annular peripheral recess having an upper surface provided with circumferentially spaced upstanding product engaging blades.

8. The combination defined in claim 7, in which the knives of one assembly are closer together than those of the other assembly so that the product will be conditioned to greater extent by said one assembly.

9. The combination defined in claim 7, in which the knives of said first assembly are spaced farther apart than the knives of said second assembly.

10. In combination: a pair of cutter assemblies, each of said assemblies comprising a pair of annular rings provided with opposed circumferentially disposed seats, a plurality of circumferentially spaced longitudinally extending knives having portions disposed in said seats, circumferentially spaced spacer means interposed between said assemblies and defining radial passages, and means common to both assemblies for clamping the latter in coaxial relationship to form a tubular cylindrical structure whereby a product to be conditioned may be presented to the knives of one assembly and then to the knives of the other assembly through said radial passages.

11. In combination: a first tubular cylindrical assembly provided with circumferentially spaced knives, a second tubular cylindrical assembly provided with circumferentially spaced knives, a housing having wall structure arranged in concentric spaced relation to said assemblies and forming a chamber, spacer means interposed between said assemblies and defining passages communicatively connecting interiors of said assemblies and said chamber, and means clamping said assemblies in coaxial relationship with said spacer means so that a product may be caused to travel through said second assembly via said passages.

12. A structure for comminuting a product, said structure comprising a pair of annular supports, a plurality of circumferentially spaced axially extending comminuting members secured between said supports, each of said members being provided with a laterally extending surface and an inner transverse surface which form an inner longitudinal edge generally constituting a line of a cylinder, an inner pair of axially spaced annular wear rings respectively secured in annular relation to said comminuting members and defining an annular space for receiving a product prior to engaging said members for reduction thereby, and an outer pair of axially spaced annular rings respectively surrounding opposite ends of said members and serving as abutments therefor.

13. Impeller means of the kind described comprising a solid body structure provided with an upper surface and having extremities and an intermediate restricted cross-sectional area, relatively long radially extending vertical blades carried by one of the extremities, and extending upwardly from said upper surface, and relatively short radially extending blades carried by said impeller means adjacent its other extremity, said blades having outer edges spaced substantially equidistant from the longitudinal axis of said impeller means.

14. The impeller means defined in claim 13, in which said intermediate area is defined in part by a tapered portion provided with a radial recess, and said short blades are secured in said recesses in abutting relation to said tapered portion.

15. The impeller means defined in claim 13, in which there is a greater number of long blades and all of said blades are respectively provided with separate cutting elements.

16. A method of cutting and conditioning a product which comprises rotating it about an axis and directing it outwardly for engagement with circumferentially spaced stationary surfaces which are disposed substantially tangent to a first set of circumferentially spaced cutting edges, directing the product into engagement with such edges to cut it into pieces and for release therefrom, and directing the pieces for engagement with a second set of circumferentially spaced cutting edges for conditioning said pieces.

References Cited by the Examiner

UNITED STATES PATENTS

| | | | |
|---|---|---|---|
| 277,790 | 5/1883 | Saint Requier | 146—71.5 |
| 297,503 | 4/1884 | Cormack | 146—71.5 |
| 315,143 | 4/1885 | Hudson et al. | 146—71.5 |
| 500,729 | 7/1893 | Winter | 146—71.5 |
| 2,031,289 | 2/1936 | Van Law | 241—275 X |
| 2,536,928 | 1/1951 | Hammell | 241—46.1 |
| 2,875,800 | 3/1959 | Urschel | 146—165 X |
| 2,920,830 | 1/1960 | Nyrop et al. | |
| 2,928,616 | 3/1960 | Smith | 241—275 |
| 2,950,868 | 8/1960 | Lannert | 241—275 X |
| 3,154,259 | 10/1964 | Behnke et al. | 241—275 |

FOREIGN PATENTS 16,272  1891  Great Britain.

ROBERT C. RIORDON, *Primary Examiner.*

J. SPENCER OVERHOLSER, *Examiner.*